US012578414B2

(12) United States Patent
Crockett et al.

(10) Patent No.: US 12,578,414 B2
(45) Date of Patent: Mar. 17, 2026

(54) WIRELESS COMMUNICATION SYSTEMS AND METHODS

(71) Applicant: Focal Point Positioning Limited, Cambridge (GB)

(72) Inventors: Robert Mark Crockett, Cambridge (GB); Peter James Duffett-Smith, Cambridge (GB); Ramsey Michael Faragher, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 317 days.

(21) Appl. No.: 18/214,805

(22) Filed: Jun. 27, 2023

(65) Prior Publication Data

US 2023/0417858 A1 Dec. 28, 2023

(30) Foreign Application Priority Data

Jun. 28, 2022 (GB) ...................................... 2209484

(51) Int. Cl.
 *G01S 5/00* (2006.01)
 *G01S 5/02* (2010.01)
(52) U.S. Cl.
 CPC .............. *G01S 5/01* (2020.05); *G01S 5/0269* (2020.05)

(58) Field of Classification Search
 CPC .......... G01S 5/01; G01S 5/0269; G01S 5/011; G01S 5/0218; G01S 19/34; G01S 19/26;
 (Continued)

(56) References Cited

U.S. PATENT DOCUMENTS 10,330,791 B2 * 6/2019 Revol ................. G01S 13/9058
12,292,517 B2 * 5/2025 Kim .......................... G06N 7/01
 (Continued)

FOREIGN PATENT DOCUMENTS

GB 2566731 3/2019
WO WO 2017/163042 A1 9/2017
 (Continued)

OTHER PUBLICATIONS

PCT International Search Report and Written Opinion for Application No. PCT/GB2023/051664 dated Sep. 15, 2023, 19 pgs.
 (Continued)

*Primary Examiner* — Dhaval V Patel
(74) *Attorney, Agent, or Firm* — Moser Taboada

(57) ABSTRACT

Methods and systems including: generating a first local signal (LS); receiving, at a receiver, a first signal from a remote source; determining a receiver movement; generating a first correlation signal by correlating the first LS with the first signal; providing motion compensation of at least one of the first LS, the first signal, and the first correlation signal based on the receiver movement along a direction of
 (Continued)

interest (DOI) to generate a first correlation signal; determining that the first signal has been received along the DOI, based on the first correlation signal, generating a second LS having at least one parameter based on the first signal received along the DOI; receiving, at the receiver, a second signal along the DOI; and processing the received second signal using the second LS to determine a metric of interest related to the receiver, and/or to a communications link that includes the receiver.

20 Claims, 5 Drawing Sheets

(58) Field of Classification Search
CPC .......... G01S 19/28; G01S 19/29; G01S 19/30; G01S 19/32; G01S 19/426; G01S 19/22; G01S 19/13
See application file for complete search history.

(56) References Cited

U.S. PATENT DOCUMENTS

| | | | | |
|---|---|---|---|---|
| 2014/0062781 A1* | 3/2014 | Mathews | ................ | G01S 19/11 |
| | | | | 342/357.64 |
| 2017/0279598 A1 | 9/2017 | Faragher et al. | | |
| 2019/0011569 A1 | 1/2019 | Faragher et al. | | |

| | | | | |
|---|---|---|---|---|
| 2020/0041656 A1* | 2/2020 | Cheng | .................... | G01S 19/23 |
| 2020/0319347 A1 | 10/2020 | Faragher | | |
| 2021/0157014 A1 | 5/2021 | Cookman | | |
| 2022/0026583 A1* | 1/2022 | van Diggelen | ......... | G01S 19/29 |

FOREIGN PATENT DOCUMENTS

| | | |
|---|---|---|
| WO | WO 2019/008327 A1 | 1/2019 |
| WO | WO 2019/058119 A1 | 3/2019 |
| WO | WO 2019/063983 A1 | 4/2019 |

OTHER PUBLICATIONS

Leclere Jerome et al. "Comparison of L1 and L5 Bands GNSS Signals Acquisition", Sensors, [Online] vol. 18, No. 9, Aug. 23, 2018, pp. 2779-2805, XP093077320, CH ISSN: 1424-8220, DOI: 10.3390/s18092779 retrieved from the internet: URL:https://www.ncbi.nlm.nih.gov/pmc/articles/PMC5=6165328/pdf/sensors-18-02779.pdf>.

Kaplan, Elliott D et al., "Chapter 4—GPS satellite signal characteristics", Understanding GPS: principles and applications, Dec. 31, 2005, pp. 113-151, XP93077959, Boston, Mass. [u.a.], ISBN: 978-1-58053-894-7, Retrieved from the internet: URL:https//spada.uns.ac.id/pluginfile.php/256518/mod_resource/content/1/about%20GPS%20full.pdf.

* cited by examiner

WIRELESS COMMUNICATION SYSTEMS AND METHODS

CROSS-REFERENCE

This application claims priority to United Kingdom Application No. 2209484.1, filed Jun. 28, 2022. The entire content of that application is incorporated herein by reference.

FIELD

Embodiments of the invention relate to wireless communication systems and methods and, in particular, relate to positioning systems such as GNSS positioning systems.

BACKGROUND

Traditional GNSS receivers have mainly used "L1" signals, which are signals transmitted in the L1 frequency band (centre frequency 1.57542 GHz). Many modern day civilian GNSS receivers are able to receive signals in the "L5" band (centre frequency 1.17645 GHz), and this band has become more popular in recent times with increasing numbers of satellites transmitting within this band.

Signals transmitted in the L5 band provide a number of advantages over L1 signals when used in GNSS applications for navigation and tracking. The bandwidth of L5 signals is 10 times greater than that of L1 signals (the chipping rate of GPS L5 signals is 10.23 Mcps compared to 1.023 Mcps for civilian GPS L1 C/A signals), which can provide increased processing gain and improved positioning accuracy. L5 signals are also transmitted with greater power than L1 signals, and furthermore their lower frequency can improve reception for indoor applications.

However, the increased chipping rate of the L5 signals means that a higher sampling rate is required at the receiver than for L1 signals. This means that the processing of the L5 signals is more computationally intensive than for L1 signals, requiring more processing power and battery resources. This is a particular issue when the positioning system is implemented on a user device such as a modern day smartphone which has limited processing power and battery resources.

Furthermore, there remains an issue that L5 signals are still subject to multi-path effects, particularly in challenging positioning environments where reflections are prevalent. Multi-path effects are where a signal from a satellite (or other remote source) takes an indirect non-straight-line (NSL) trajectory from the satellite to the receiver, for example as a result of reflection(s) off tall buildings in a so-called "urban canyon". Multi-path effects cause two main issues. Firstly, a reflected signal from a satellite may have a higher absolute power than the desired straight-line (SL) signal, in which case the receiver may undesirably lock on to the NSL signal. Due to the extra path length of the NSL signal compared to the desired SL trajectory, the pseudo-range is incorrectly calculated. Secondly, the NSL signal may interfere (e.g. constructively or destructively) with the SL signal at the receiver, having an adverse effect on the ability of the receiver to accurately process the received signal. These issues remain even with the improved processing provided by L5 signals.

Similar issues exist in wireless communication systems other than GNSS positioning systems, such as Wi-Fi, cellular and other radio systems that process multiple signals at different frequencies and with different signal characteristics (e.g. different bandwidths) typically broadcast from the same transmitter.

There is therefore a desire to provide methods and systems address the issues that exist in the wireless communication systems described above.

SUMMARY

Embodiments of the present invention generally relate to a method and apparatus for conserving processing or battery resources in a tracking system as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Example embodiments of the invention will now be described with reference to the accompanying figures, in which.

DETAILED DESCRIPTION

The following description will focus on embodiments of the invention implemented in positioning systems where the processed signals are GNSS positioning signals, for example in order to determine a position, velocity and/or time related to the receiver. However, the techniques taught herein may be applied in other wireless communications systems for processing other (e.g. radio) signals such as cellular, WiFi, etc. in order to determine other metrics of interest as has been discussed herein.

Figure 1:
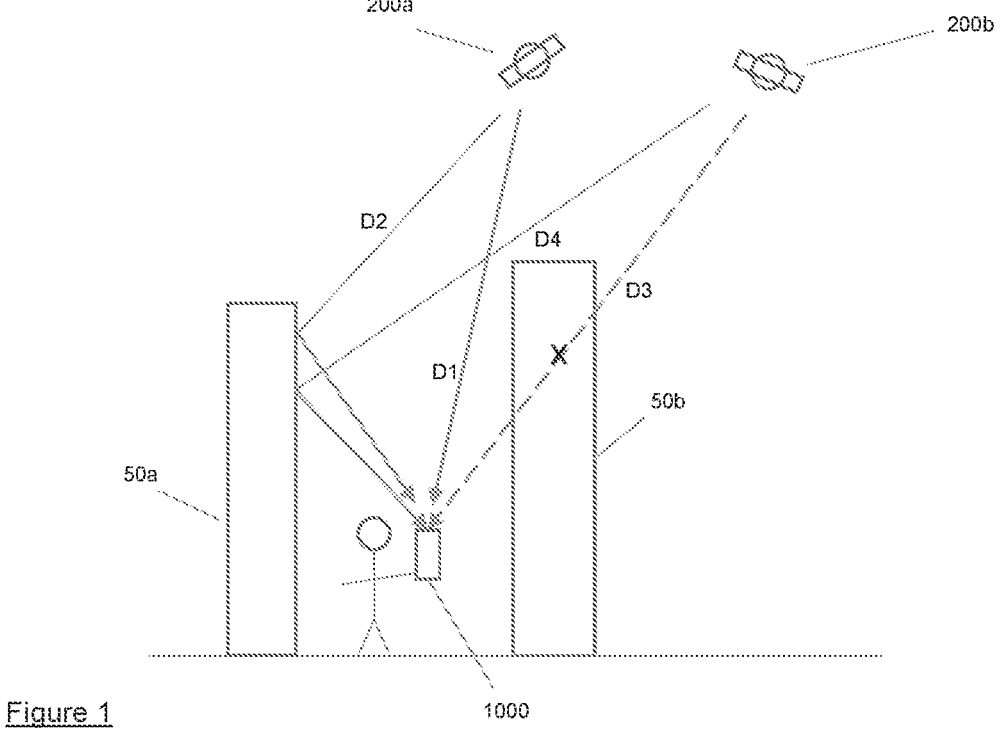
FIG. 1 is a schematic diagram illustrating an example environment in which the positioning system and method of the present invention may be used.

FIG. 1 is a schematic diagram illustrating, by way of example, an environment in which a positioning device 1000 is positioned within an "urban canyon" environment, located between tall buildings 50a, 50b off which radio signals, including GNSS signals from remote sources, may be reflected. Such an "urban canyon" environment is typically a challenging environment for positioning systems to accurately determine a position solution due to reflections and multipath effects.

In the example of FIG. 1, the positioning device 1000 receives signals from GNSS positioning satellites 200a, 200b, which in this example are part of the Global Positioning System (GPS) constellation. However, it will be appreciated that embodiments of the present invention may be used with other GNSS system such as GLONASS, Galileo or Beidou systems. The positioning device receives a GPS L1 signal from the first satellite 200a along a straight line (SL) direction D1 between the device and the satellite, which may be referred to as the "line of sight" (LOS) direction. The signal from the first satellite 200a also includes a reflected component D2 which arrives at the positioning device having undergone a reflection off the surface of building 50a. The positioning device also receives an L1 signal from the second satellite 200b which includes a strong reflected component D4. However, as schematically illustrated in FIG. 1, the signal from the second satellite 200b is not received at the positioning device 1000 along the LOS direction D3 as this component is blocked by the building 50b.

The positioning satellites 200a, 200b also transmit signals within the GPS L5 band, and it is desirable to receive and process these signals in order to utilize the properties of the L5 signals for enhanced navigation and tracking solutions in comparison to GPS L1 signals. The paths of the L5 signals between the satellites and the positioning device 1000 are the same as described above for the L1 signals. FIG. 1 illustrates some of the challenges faced by positioning systems when attempting to determine a navigation or tracking solution within challenging environments such as the illustrated urban canyon. The LOS and reflected components of the broadcast signal from satellite 200a arrive at the positioning device via different paths as shown at D1 and D2, and therefore are received at different times and possibly with different attenuation and phase characteristics.

Thus, the LOS and reflected components of the signal received from satellite 200a may act as noise in relation to each other (e.g. through constructive and/or destructive interference), causing significant problems in positioning accuracy.

Furthermore, the signal from satellite 200b is only received at the positioning device 1000 following a reflection (since the LOS direction is blocked by building Conventional multi-band systems may determine that the L1 signal from satellite 200b is received with a power above a predetermined threshold and therefore proceed to process L5 signals from satellite 200b with confidence in order to capitalise on the improved processing and positioning accuracy provided by such signals. However, due to the reflected nature of the received signal, navigation and tracking solutions generated using the L5 signals will remain erroneous, even though the tracking and navigation solutions may be being reported with confidence.

Embodiments of the present invention seek to overcome these issues.

Figure 2:
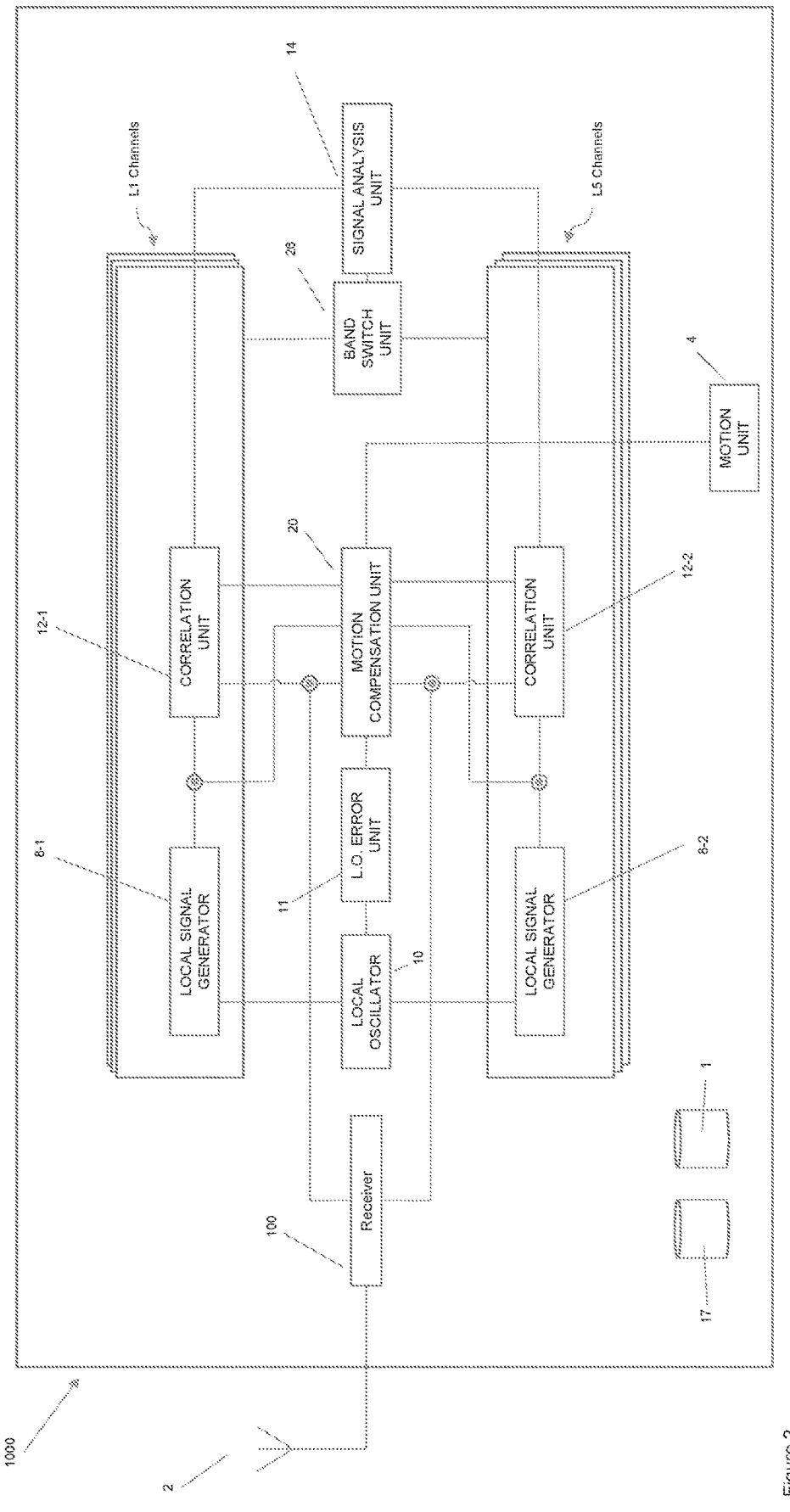
FIG. 2 is a schematic diagram illustrating the pertinent parts of a positioning system according to an embodiment of the invention.

FIG. 2 is a schematic diagram illustrating the pertinent parts of a positioning system (e.g. implemented on a single positioning device 1000 as shown in FIG. 1) according to an embodiment of the invention. A receiver, shown schematically at 100, includes or is coupled to an antenna 2 that is configured to receive radio frequency signals such as GNSS signals as discussed above. In particular, the antenna 2 is configured to receive radio-frequency signals in two or more separate radio-frequency bands (although it is envisaged that the receiver could comprise or be coupled to separate dedicated antennas for respective frequency bands). In this embodiment, the antenna is capable of receiving signals in both the L1 frequency band (1.57542 GHz) and the L5 frequency band (1.17645 GHz). Typically, the broadcast signal received at the antenna 2 is an analogue signal and is amplified, down-converted to baseband or lower frequency and converted to digital form by an analogue to digital converter. These processes typically take place in the receiver. The positioning device 1000 could be a standalone device or could be implemented in an electronic consumer device such as a smartphone.

As schematically shown in FIG. 2, the positioning system comprises signal processing channels for different frequency bands. In this embodiment, the system comprises a plurality of channels configured to process signals received (e.g. from different satellites) within the L1 frequency band, and a plurality of channels configured to process signals received within the L5 frequency band, as schematically illustrated in FIG. 2. The following description will refer to the processing of signals on the L1 channels, although the corresponding description applies to the processing performed in the L5 channels.

The received L1 signal is correlated in a correlation unit 12-1 against a local replica of that signal generated by local signal generator 8-1. The correlation unit comprises a correlator. The local signal generator 8-1 is configured to generate local copies of known correlation sequences (such as pseudorandom number (PRN) codes for GNSS satellites) using a frequency or phase reference of a local oscillator 10. The local signal generator is typically a frequency synthesizer. The local oscillator 10 is generally simple and low cost, especially when the positioning device is implemented on a handheld electronic device such as a smartphone. For example, the local oscillator 10 may comprise a quartz crystal.

A motion unit 4 includes sensors that can measure the motion of the receiver 100, in particular the motion of the antenna 2. The motion unit 4 can include inertial sensors such as accelerometers and gyroscopic sensors, data from which may be used to infer the motion of the receiver. The motion unit 4 typically comprises an inertial measurement unit (IMU) using inertial sensors, although other (non-GNSS) means of determining a motion of the receiver may alternatively or additionally be used, such as barometers, magnetometers and visual odometry systems. In some embodiments the motion unit 4 may include a trained machine learning model that may predict the motion of the receiver.

A motion compensation unit 20 derives motion compensation phasors indicative of the amplitude and/or phase changes introduced into the received signal as a result of the determined motion of the receiver determined by the motion unit 4. The motion compensation phasors may be applied to at least one of the local signal from the local signal generator 8-1, the received signal, and the correlation signal from the correlation unit 12-1. Phasors generated by the motion compensation unit 20 may be stored in storage device 17 (e.g. memory) for use in subsequent time periods.

Following acquisition, updated estimates of the code phase and frequency of the received signal may be feed back to the local signal generator 8-1 in order to track the received signal. Such "tracking loops" may be delay-locked loops (DLL) to track the code phase of the incoming signal, and phase-locked loops (PLL) or frequency-locked loops (FPP) to track the carrier wave, as are known in the art.

Signal analysis unit 14 analyses the output of the motion-compensated correlation of the channels in order to provide a navigation or tracking solution, as will be described in further detail herein.

Each of the above described units of the positioning system is in logical communication with a processor 1, which is operable to control the operation of the various units in accordance with executed software or firmware. In the presently shown embodiment, the units (or "modules")

are provided within a single positioning device 1000. It will be appreciated that the illustrated arrangement of the various units is exemplary only, and the units may be arranged in accordance with the device that the system is implemented on, as required. In alternative embodiments the various units of the system may be provided in a distributed fashion across a network.

Figure 3:
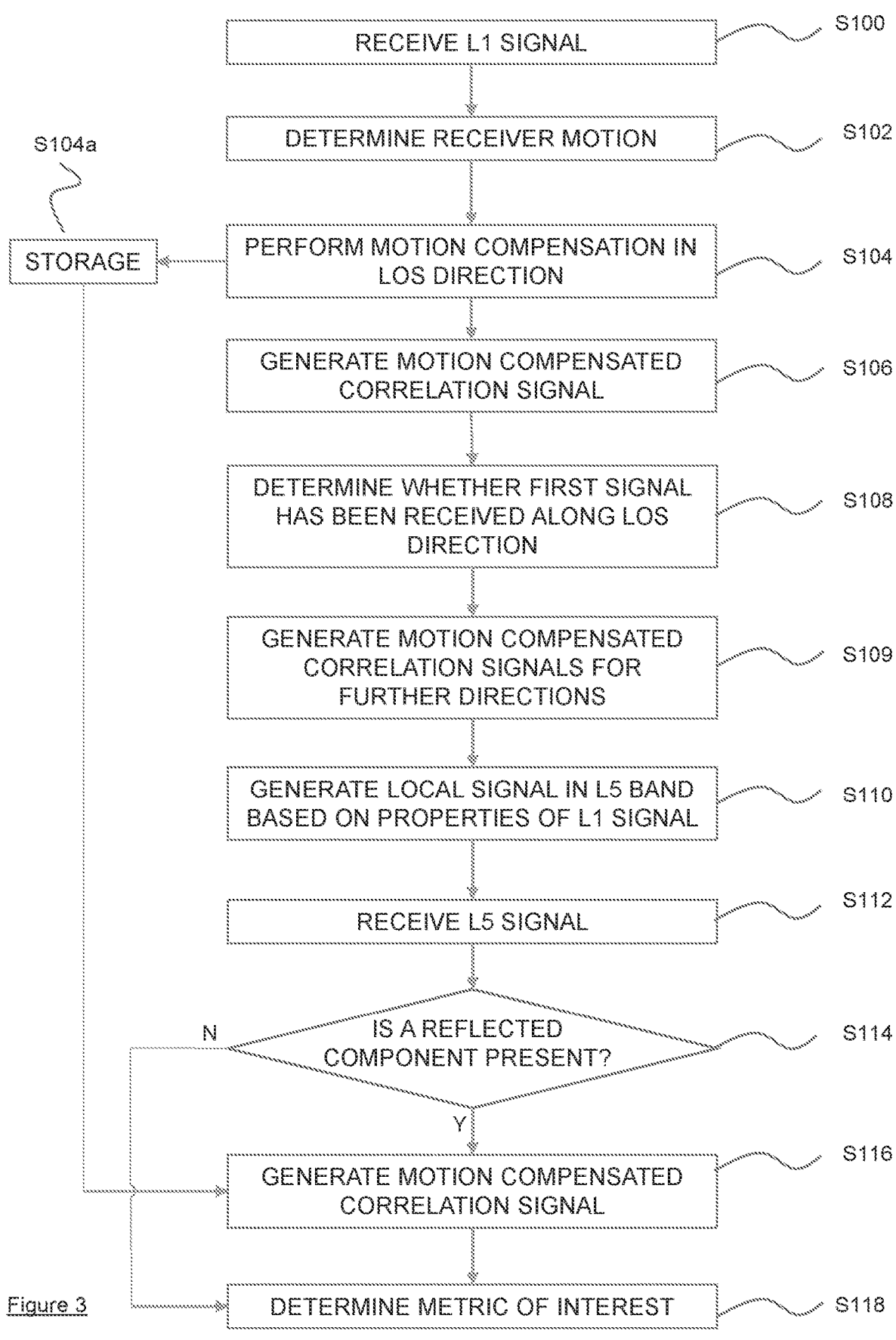
FIG. 3 is a flow diagram illustrating steps of a method according to an embodiment of the invention.

FIG. 3 is a flow diagram outlining the main steps of an embodiment of the invention, and will be described with reference to the positioning device and environment illustrated in FIGS. 1 and 2. At step S100, the receiver 100 receives a GPS L1 signal from a satellite, for example from positioning satellite 200*a*. As discussed above, the signals received at the receiver include components that have travelled along a straight line between the receiver and satellite, as well as reflected non-straight-line directions. The following description of FIG. 3 will primarily be based on the processing of positioning signals received from satellite 200*a*, although it will be appreciated that the steps of the flow chart may be performed for any remote source (or co-located remote sources) from which signals within two frequency bands may be received.

At step S102, the motion unit 4 determines the motion of the receiver 100. The motion unit 4 may measure the motion of the receiver using data obtained from inertial sensors as part of an IMU, for example by integrating acceleration measurements from an accelerometer in order to infer a velocity of the receiver. The motion module may assume ("predict") the motion of the receiver based on patterns of movement in previous epochs. For instance, if previous measurements indicate that the receiver 100 is moving in a constant direction and at a constant speed then it may be assumed the current motion is that same as that in previous time periods. This is particularly the case for contexts in which the motion is likely to remain substantially similar, for example if the receiver is located within a moving vehicle or is being held by a jogger. By assuming the motion of the receiver for suitable time periods, processing load may be reduced and battery resources conserved. The motion unit 4 may compute the motion based upon historical motion at specific times of the day or may use machine learning using, for example, a recurrent neural network, to predict motion from historical motion data.

At step S104, the motion compensation unit 20 receives the determined movement of the receiver from the motion unit 4 and generates a phasor sequence in accordance with the receiver motion in the line of sight (straight line) direction D1 between the receiver and satellite 200*a*. (It is noted that in this example the direction of interest is the line of sight, LOS, direction, although as discussed the direction of interest may be a direction other than the line of sight.) Thus, referring back to FIG. 1, with regard to signals received from satellite 200*a* the motion compensation unit 20 is configured to construct a phasor sequence indicative of the receiver motion along the LOS direction D1. Similarly, when processing signals from satellite 200*b*, the motion compensation unit 20 is configured to construct a phasor sequence that is indicative of the receiver motion along the LOS direction D3. These straight-line directions may be known or estimated based on an initial estimate of the receiver's position and from broadcast orbital data or ephemeris from the satellite constellation. An initial estimate of the receiver's position may be determined using conventional GNSS ranging calculations based on the signals that are available. An initial estimate of position can also be determined based on cellular data if available (e.g. where the system is provided in a smartphone). Typically an initial estimate of position can be determined using conventional techniques within an accuracy of better than 20 metres, depending on the receiver's environment.

Each phasor sequence $\phi$ comprises a plurality of phasors, with each phasor typically having the same time duration as a sample of the received signal. There is typically the same number, N, of phasors $\phi_i$ (I=1 . . . N) in a generated phasor sequence $\phi$ as there are samples of the received signal and samples of the local signal during the time period within which the signal received and the receiver movement is measured. Each phasor $\phi_i$ represents a phase and amplitude compensation (e.g. each phasor contains a phase angle and an amplitude) based upon the motion of the receiver at a time t such that a phasor sequence made up of a plurality of phasors is indicative of the receiver motion along a particular direction as a function of time. In this way, each phasor sequence is indicative of the phase and/or amplitude changes introduced into the received signal as a result of the motion of the receiver. For example, a velocity of the receiver derived from the motion unit 4 may be used to determine a Doppler frequency shift introduced into the received signal due to the motion of the receiver along the line-of-sight direction. The Doppler frequency shift may then be integrated over time in order to estimate a phase value.

Thus, the phasor sequence may be referred to as a "motion-compensated" phasor sequence.

A phasor $\phi_i$ is a transformation in phase space and is complex valued, producing the in-phase component of the motion-compensated phasor sequence via its real value, and the quadrature phase component of the motion-compensated phasor sequence via its imagery value. The phasor $\phi_i$ is typically a cyclic phasor and may be expressed in a number of different ways, for example as a clockwise rotation from the real axis or as an anti-clockwise rotation from the imaginary axis. As explained above, the phasor sequence for each direction is indicative of the determined movement of the receiver along that direction.

Each phasor sequence may be stored in storage unit 17 (step S104*a*) and re-used in appropriate subsequent time periods where the determined motion of the receiver remains substantially constant across the time periods.

Referring back to FIG. 3, in step S106, a motion-compensated correlation signal is generated for the received L1 signal along the LOS direction D1 between the receiver and the satellite 200*a*. The correlation unit 12 correlates the local signal produced by the local signal generator 8-1 of the L1 channel with the received signal, with motion compensation being applied to at least one of the local signal, the received signal, and the resulting correlation signal, based on the determined movement of the receiver along the LOS direction D1 as determined by the motion unit 4. This is performed by combining (e.g. mixing) the phasor sequence derived by the motion compensation unit 20 in step S104 with at least one of the received signal, the local signal, and the correlation signal.

Figure 4:
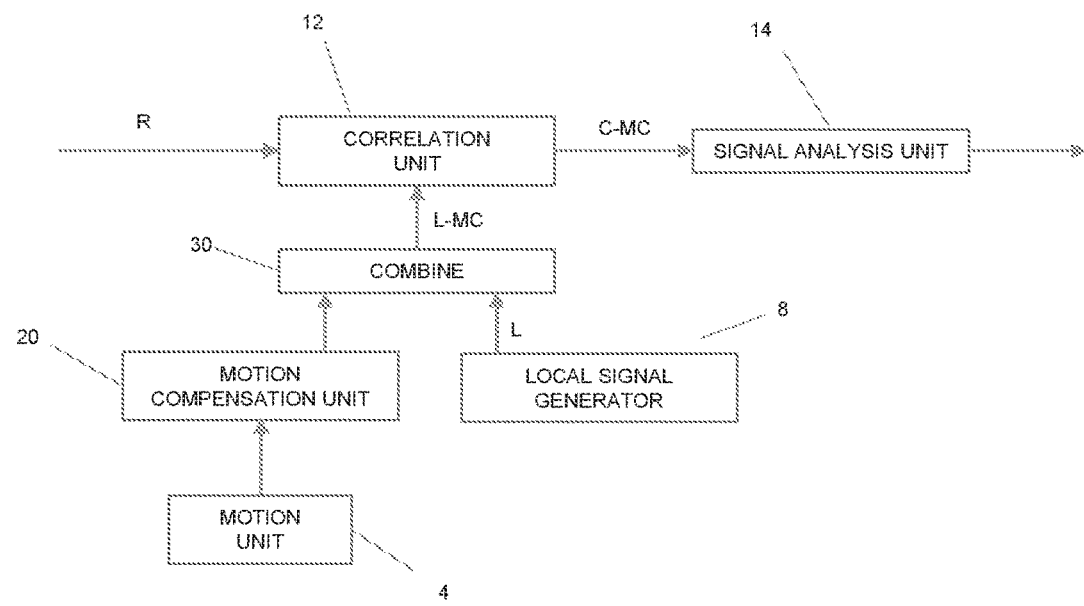
FIG. 4 is a schematic diagram illustrating how a motion compensated correlation signal may be generated, according to an embodiment of the invention.

Each phasor sequence $\phi$ may be applied to at least one of the local signal, the received signal, or the result of the correlation (e.g. the initial correlation signal). FIG. 4 is a schematic diagram illustrating how a phasor sequence calculated by the motion compensation unit 20 may be combined with the local signal in order to generate the motion-compensated correlation signal. As explained above, motion unit 4 provides a determined motion of the receiver, which is used by the phasor generation unit 20 to generate a phasor sequence that is indicative of the receiver motion in the LOS direction between the receiver and satellite. The local signal L generated by the local signal generator 8-1 is combined (e.g. mixed) (30) with the phasor sequence generated by motion compensation unit 20-1 to produce a motion-compensated local signal, shown at L-MC in FIG. 4. This motion-compensated local signal L-MC is then correlated with the received signal R (e.g. following initial processing by the receiver) at correlation unit 12 to provide a motion-compensated correlation signal, shown at C-MC. The motion-compensated correlation signal is then passed to the signal analysis unit 14. In practice, both the in-phase and quadrature phase components of the phasor sequence φ will be combined with the local signal to produce both in-phase and quadrature phase motion-compensated local signals for correlation.

Figure 5:
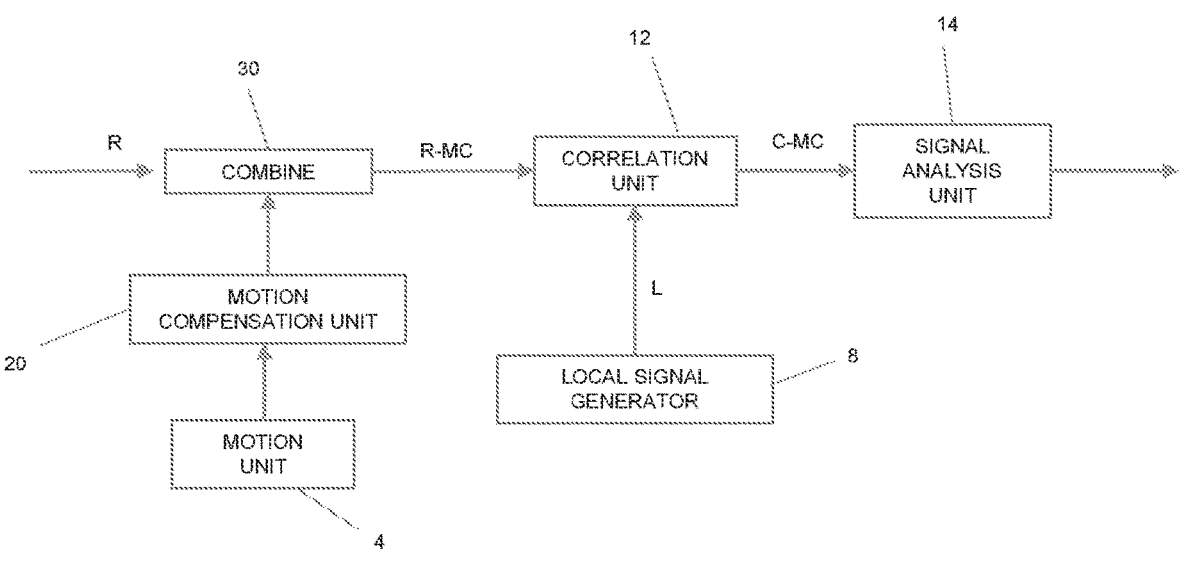
FIG. 5 is a schematic diagram illustrating how a motion compensated correlation signal may be generated, according to an embodiment of the invention.
Figure 6:
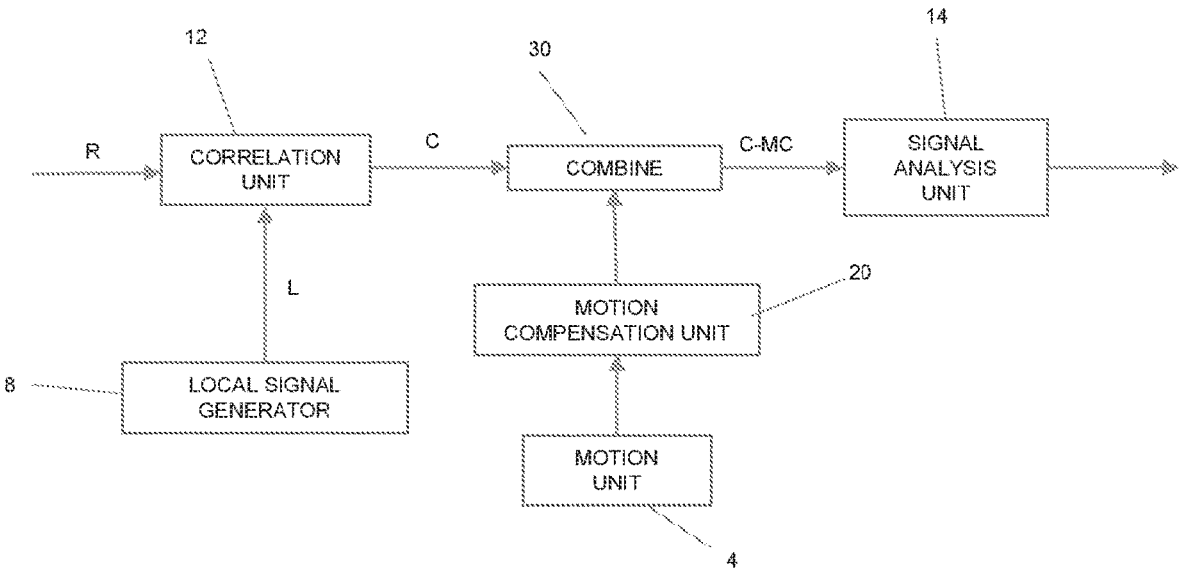
FIG. 6 is a schematic diagram illustrating how a motion compensated correlation signal may be generated, according to an embodiment of the invention.

As has been explained herein, in general a phasor sequence φ may be applied to at least one of the local signal, received signal and correlation signal generated by the correlator in order to perform motion compensation. FIG. 5 schematically illustrates providing motion compensation to the received signal R (generating a motion-compensated received signal R-MC for correlation with the local signal L) to thereby generate a motion compensated correlation signal C-MC. FIG. 6 schematically illustrates the process of applying motion compensation to the correlation signal (C) generated by correlating the (un-motion-compensated) received and local signals in order to generate a motion compensated correlation signal C-MC that can be passed to the signal analysis unit 14.

The number of corrective phasors in a phasor sequence φ corresponds to the number of samples of the signal to which motion compensation is being applied (e.g. over the time period of coherent integration). For example, both the received and local signals will typically be sampled at the same rate and therefore have the same number of samples per second (e.g. 4 million samples per second). Thus, for example, the same phasor sequence φ may be applied to either the local signal or the received signal in order to generate the same motion-compensated correlation signal. When applying motion compensation to the correlation signal following correlation of the ("original") local and received signals, the phasor sequence φ will typically have fewer elements than when applied to the local or received signals, due to the typical lower sampling rate of the correlation signal (e.g. ~1000 samples per second).

Further details on the generation of motion-compensated phasor sequences and their use in generating a motion-compensated correlation signal can be found in commonly assigned patent publication WO2017/163042, which is hereby incorporated herein by reference in its entirety.

This process yields a motion-compensated correlation signal for which a signal-to-noise ratio (SNR) can be calculated. This SNR can be used to determine whether the L1 signal has been received along the LOS direction between the receiver 100 and the satellite 200a. If the SNR of the motion compensated correlation signal in the LOS direction is greater than a predetermined threshold, then it can be inferred that the receiver 100 receives a signal along the LOS direction between the receiver and the remote source. Referring back to FIG. 1, when analysing the signals received from satellite 200a, although the receiver 100 receives both LOS (D1) and reflected (D2) components of a broadcast signal, the SNR of the motion-compensated correlation signal along the LOS direction is greater than a predetermined threshold, thereby indicating that a signal component is indeed received along the LOS. In contrast, for the satellite 200b although the overall signal strength received from satellite 200b will be relatively high due to the reflected component D4, the SNR ratio of the motion-compensated correlation signal along the LOS direction D3 is below the predetermined threshold, indicating that the LOS component is not received at the receiver (in this case being blocked by the building 50b).

Thus, by performing motion compensation in this way, it can be determined whether or not a signal is received along the LOS direction between the receiver and respective satellite (step S108). The directionality provided by the motion compensation process advantageously allows for the energy search to be performed along the LOS direction, enhancing the accuracy of this determination.

Optionally, at step S109, motion compensated correlation signals may be generated for further directions other than the LOS direction described above. This may advantageously be used to determine the receiver's signal environment, for example to establish whether reflected signals are present. The signal analysis unit is configured to determine one or more candidate directions along which a reflected signal may be received. By generating motion compensation phasor sequences indicative of the receiver motion along these candidate directions and then generating motion compensated correlation signals corresponding to these directions, it can be established whether or not reflected signals were indeed received along the candidate directions. Although not essential, the candidate directions may be determined using a 3D topographical model, for example a 3D city model, of the receiver's environment, based on the receiver's initial estimate of position and the facts already established. Such a 3D model may be stored on storage device 17 or retrieved over an internet or other data connection.

Continuing with the example environment shown in FIG. 1, the established facts with respect to satellite 200a are that a LOS signal is present due to the SNR of the motion-compensated correlation signal along that direction being greater than the predetermined threshold. However, the SNR might not correspond to the overall signal strength received at the receiver, indicating that a reflected component is present. The 3D model may be used to determine a candidate direction along which a reflected signal might be received at the receiver, for example reflected off building 50a as shown in FIG. 1. If a motion-compensated correlation signal in respect of the candidate direction D2 is generated, it will have a high SNR as the candidate direction corresponds to the actual reflected direction. This indicates that the signal received from satellite 200a indeed includes a reflected component.

Similarly, the established facts with regard to satellite 200b are that it is unlikely that the signal is received along the LOS direction (due to the low SNR of the motion-compensated correlation signal along that direction), but that the overall signal strength received at the receiver is high. This strongly indicates the presence of a reflected component that is received at the receiver. Again, the 3D model may be used to determine one or more candidate directions in which to perform further motion compensation and generate motion compensated correlation signals. In this case, a motion compensated correlation signal corresponding to the direction D4 will return a very high SNR, which is highly indicative of the presence of a reflected component.

In some embodiments, the system will not have access to a 3D model. In such embodiments, the signal analysis unit 14 may determine the candidate directions based on a "brute force" search of the sky. A plurality of candidate directions, for example each being defined by an azimuth angle and an elevation angle, may be determined for substantially all directions in which a signal may be received. By generating a motion compensated correlation signal for each possible direction, the SNR ratios may be analysed in order to infer the likelihood that a reflected signal is received along that direction.

Such a "brute force" search of the sky is computationally intensive, and therefore is a full scan of the signals received at the receiver is desired, it is preferred to make use of a 3D model.

Thus, the method may comprise using a plurality of motion compensated correlation signals to measure signal power arriving from different directions. The plurality of motion compensated correlations signals (and therefore the subsequent determination of the angles of arrival) may be generated substantially simultaneously by applying different phasor sequences—corresponding to the different candidate directions—to the correlation bank. The different correlation signals are sensitive to energy arriving from different directions, even when a single omnidirectional antenna is used.

Motion compensation can be provided in respective different directions by providing a phase shift between signals that are received at different times.

Further information on determining candidate directions in order to establish the presence of reflected signals and the receiver's signal environment may be found in commonly assigned patent publication WO2019/058119, which is hereby incorporated herein by reference in its entirety.

Referring back to FIG. 3, once it has been determined that the first signal has been received along the LOS direction between the receiver and satellite 200a, at step S110, a second local signal is generated based on the properties of the received first signal along the LOS direction. It is recalled that in this example the determination in step S108 is made on the L1 channel(s). Thus, once it has been established that L1 signals from a satellite 200a are being received along the LOS, the parameters of the L5 channel(s) can then be set in order to track the LOS L5 signals from the same satellite with confidence. In some examples, the L5 channels may not be actuated until it has been determined that the L1 signal has been received along the direction of interest, thereby further saving battery energy.

Thus, the local signal generator 8-2 of the L5 channel corresponding to the satellite 200a is used to generate a local signal at the expected code phase and frequency of an L5 signal received from the same satellite 200a along the line of sight D1, based on the corresponding properties of the first signal received on the L1 channel along the line of sight. In other words, the L5 channel of the receiver may start tracking LOS L5 signals from the satellite 200a using the information that has been obtained by processing the L1 signals on the L1 channel. It is noted that appropriate transforms of the expected code phase and frequency will need to be performed in order to transform these from results obtained on the L1 channels to those suitable for the L5 channels. A band switch unit 26 in communication with the signal analysis unit 14 and each channel is configured to provide the predicted parameters (e.g. code phase and frequency) to the L5 channels based on the processing of the L1 signals, and to perform the appropriate transformations.

The transformations of the code phase and frequency of the received L1 signal(s) to those expected on the L5 channel(s) are carried out based on the known difference between the L1 and L5 nominal frequencies. For example, once the Doppler shift of the L1 carrier frequency is determined based on the processing on the L1 channel (e.g. due to satellite and receiver motion, and clock error), then it is possible to calculate the expected Doppler shifted correction to the nominal frequency that the L5 signal will be detectable on. Similarly, by using the signals received on the L1 channels to calculate the current estimate of receiver position and time (Time of Week), then the expected L5 code phases can be calculated based on the current estimate of receiver position and time. In this way, the properties of the received first signal(s) can be used to calculate the expected parameters (e.g. Doppler shift and code phase) in order to process (e.g. track) L5 signals from the same satellite without requiring a computationally-intensive acquisition process.

In this way, the invention is able to minimise processing load and conserve battery resources in tracking the L5 signals, as the initial acquisition and determination of the expected code phase and frequency are performed on the L1 signals which have a lower sampling rate than the L5 signals. Furthermore, following the determination that signals from a satellite are being received along the line of sight, the L5 signals from the same satellite may be tracked with high confidence based on the generated local signal for the L5 channel. For example, referring back to FIG. 1, following the determination that signals from the first satellite 200a are being received along the LOS direction, L5 signals received from the satellite 200a may be processed with confidence following the generation of the L5 local signal based on the L1 processing.

Conversely, since L1 signals from the second satellite 200b only arrive at the receiver following a reflection, following processing of L1 signals received from this satellite it may be decided to not attempt to track L5 signals from satellite 200b as it is likely that they would lead to erroneous solutions and therefore waste computational resources and battery life. Thus, when processing signals from satellite 200b, the method may end after step S109. This is in contrast to conventional systems that may attempt to track L5 signals from satellite 200b if the received L1 signal strength is greater than a predetermined threshold, even if this is solely due to reflected signals.

At step S112, an L5 signal from satellite 200a is received at the receiver. As discussed, the properties of the L5 channel of the receiver are set such that the received LOS L5 signal may be tracked immediately rather than using computational resources in searching the code phase and frequency space in order to acquire the signal. In order to further reduce computational load, once the received L5 signal is being tracked, the trackers of the L1 channel may be stopped.

In various embodiments, the method then proceeds to decision step S114 based on whether any reflected components are present (e.g. following the analysis of the further motion compensated correlation signals generated in step S109). If it is determined that for a particular satellite there is both a component received along the LOS direction and a reflected component, the method moves to step S116 where a motion compensated correlation signal for the L5 signal is generated based on determined motion of the receiver along the determined LOS direction. By providing motion compensation along the determined LOS direction between the receiver and the satellite, the resulting motion compensated correlation signal is provided with preferential gain as compared to signals that are not received along the LOS direction in which motion compensation is provided. Thus, for the positioning satellite 200a in FIG. 1, the signal component received along the LOS direction D1 is advantageously provided with increased gain compared to any reflected components present. The generation of a motion compensated correlation signal in this way also helps to mitigate multipath effects due to reflected components of the signal.

In order to reduce computational load in this step, the motion compensation phasor sequences generated on the L1 channel in step S104 and stored in step S104*a* may be re-used in step S116 in order to avoid the requirement to re-calculate the phasor sequences. The motion compensation phasor sequences are re-used in the event that the motion of the receiver is substantially the same as when the phasor sequences were constructed. This requirement may be verified using the sensors of the motion unit 4, for example to establish that there has been no heading change or variation in velocity. If on the other hand the data from the motion unit indicates that there has been a change in the receiver motion from the time period during which the phasor sequences were constructed on the L1 channel, then the motion compensation unit 20 re-calculates phasor sequences indicative of the current receiver motion during the subsequent time period in which processing on the L5 channel is performed.

It will be appreciated that in order to "re-use" the phasor sequences stored in storage device 17, the phase values need to be transformed appropriately from the L1 channel to the L5 channel based on the difference in wavelength between the L1 and L5 signals. Such transformations may be performed in the band switch unit 26.

The method then proceeds to step S118, where the signal analysis unit 14 determines a metric of interest related to the receiver, such as a position, velocity, time, or direction of motion, based on the processing of the received L5 signal. The metric of interest is typically used to determine a tracking or navigation solution for the receiver. The use of the L5 channels in determining the metric of interest (rather than the L1 channels) is advantageous due to the increased bandwidth of L5 signals, allowing for increased processing gain and improved positioning accuracy.

Alternatively, if it is determined that no reflected components are present (for example if the receiver is located in an "open sky" environment rather than the "urban canyon" illustrated in FIG. 1), the method may optionally proceed directly to step S118, i.e. without generating the motion compensated correlation signal. As the preferential gain provided due to the motion compensation is not as advantageous in such open environments due to the lack of reflected signals, computational resources may be preserved by not applying motion compensation during processing of the received L5 signal. However, in embodiments, it may be chosen to always perform motion compensation when processing the received L5 signal (i.e. independent of the receiver environment) in order to benefit from the increased signal gain and directionality provided by motion compensation.

Typically, the steps S100 to S109 are performed during a first time period, and the steps S110 to S118 are performed during a second time period later than the first time period.

As discussed above, the local signals generated by the local signal generators 8-1, 8-2 are based on local frequency and phase references provided by local oscillator 10. In some embodiments, a local oscillator error unit 11 may be used to determine an offset between the local frequency or phase reference and a received frequency or received phase of a reference signal received from an oscillator reference source, said reference signal having a known or predictable frequency or phase. In this way, errors in the local oscillator 10 can be isolated by removing the effects introduced to the received phase or the received frequency based on the relative movement between the receiver 100 and an oscillator reference source from which the reference signal is received along a vector between the two. In such embodiments, the phasor sequences generated by the motion compensation unit 20 may be further indicative of the determined offset (e.g. as a function of time). The amplitude and/or phase angle of the phasor sequence generated by the motion compensation unit 20 may be adjusted based on the determined offset (or time series of offsets) between the local oscillator and the oscillator reference source.

Thus, in optional embodiments, the method may comprise determining the component of motion of both the receiver and the oscillator reference source along the straight-line direction ("line of sight") between the two. By compensating for the offset between the local frequency or phase provided by the local oscillator and the reference signal, a moving receiver can provide longer coherent integration of signals than would otherwise be possible. Coherent integration of received signals over periods of one second or longer are possible. This means that the sensitivity of the receiver is improved such that, in combination with the use of motion compensation discussed above, weaker positioning signals may be detected and used in positioning calculations. Such embodiments are particularly beneficial in cases where the local oscillator has a large instability (e.g. quartz oscillators in low cost devices such as smartphones).

The oscillator reference source may be a terrestrial transmitter. For example, the oscillator reference source may be a cellular transmitter or DAB, DVB-T or analogue broadcasts. The oscillator reference source may be a satellite, e.g. a GNSS satellite which has an atomic local oscillator with high stability. The oscillator reference source may be the remote source from which the processed L1 and L5 signals are broadcast (e.g. satellites 200*a*, 200*b* in FIG. 1). Importantly, the local oscillator in the oscillator remote source should, at least, be more stable than the local oscillator. Further details on the use of a reference source to determine errors in the local oscillator may be found in commonly assigned patent publication WO2019/008327, which is hereby incorporated herein by reference in its entirety.

In another example, an error in the frequency or phase reference provided by the local oscillator 10. may be determined by using a plurality of phasor sequences for each direction that "test" different hypotheses of an error of the local oscillator 10. For example, in step S104, a plurality of phasor sequences may be generated that each provide motion compensation along the direction of interest, but additionally test a respective plurality of different hypotheses of frequency and/or frequency rate of change errors of the local oscillator. Thus, step S106 will provide a plurality of motion compensated correlation signals corresponding, respectively, to the error hypotheses for the local oscillator 10. The motion compensated correlation signal having the highest power is then indicative of the hypothesis that is closest to the true offset—or error—of the local oscillator. Further details on "testing" different hypotheses of the local oscillator error may be found in commonly assigned patent publication WO2019/063983, which is hereby incorporated herein by reference in its entirety.

Typically, the local oscillator error unit 11 uses the received L1 signal(s) to determine errors in the local oscillator 10 (e.g. an offset between the local frequency or phase reference and the received frequency or received phase of the reference signal received from an oscillator reference source). These offset(s) (or "errors") of the local oscillator 10, determined through the processing of the L1 signal, may then be used when processing the L5 signal(s) following determination that the L1 signals are received along the LOS direction. For example, phasor sequences generated by the motion compensation unit 20 when processing the received L1 signals that are further indicative of the determined offset may be re-used (with the appropriate transforms) when generating a motion compensated correlation signal using the received L5 signals in step S116.

The above description has been focused on GNSS positioning systems with the first signal being a GPS L1 signal in the L1 band and the second signal being a GPS L5 signal in the L5 band. As discussed, this provides the advantages of reducing processing load by performing the initial processing on the L1 signal that has a lower chipping rate than L5 signals before committing processing resources to processing the L5 signals. However, embodiments of the invention may be directed to a number of different sets of first and second signals in which it is advantageous to perform the initial processing on the first signal before the second signal can be processed with confidence in order to determine a metric of interest.

For example, the received first signal may be a low bandwidth 5G signal in the FR1 band transmitted from a cellular mast and the second signal a high bandwidth signal in the FR2 band transmitted from the same mast. In a yet further example, the first signal may be a WiFi signal transmitted in the 2.4 GHz band, and the second signal a WiFi signal transmitted from the same access point in the band. Such WiFi signals may be used to perform indoor positioning for example.

In the above examples, the first and second signals are in respective distinct frequency bands. However, this is not essential, and embodiments of the present invention may be used to process first and second signals within the same frequency band. For example, the first and second signals could comprise the civilian and military signals in the GPS L1 band. In another example, the first signal could have a larger signal to noise ratio than the second signal, enabling the code phase and frequency parameters of the first signal to be readily determined and used in the subsequent processing of the second signal, which may. In another example, the first signal could be encrypted, whereby processing the first signal allows determination that the signals received from the respective remote source can be trusted. The first and second signals will typically be transmitted over respective distinct communication channels.

It is also envisaged that the first and second signals may correspond to different signal types. For example, the first signal could be a Bluetooth signal, with at least one parameter obtained from the first signal being used to receive a second signal that is a WiFi signal from a co-located access point.

Example Embodiments

In accordance with a first aspect of the present invention, there is provided a method, performed in a wireless communication system and comprising the steps of: generating a first local signal; receiving, at a receiver, a first signal from a remote source; determining a movement of the receiver; generating a first correlation signal by correlating the first local signal with the received first signal; providing motion compensation of at least one of the first local signal, the received first signal, and the first correlation signal based on the determined movement of the receiver along a direction of interest to thereby generate a first motion compensated correlation signal; determining that the first signal has been received along the direction of interest, based on the first motion compensated correlation signal; following determining that the first signal has been received along the direction of interest, generating a second local signal, the second local signal having at least one parameter based on the first signal received along the direction of interest; receiving, at the receiver, a second signal along the direction of interest; and processing the received second signal using the second local signal in order to determine a metric of interest related to the receiver, and/or related to a communications link that includes the receiver.

In this way, embodiments of the present invention may be used to determine that a signal has been received along a direction of interest (which is typically a straight line—or "line-of-sight"—direction between the receiver and the remote source, as will be further explained below), before investing resources in processing a second signal. In this way, the processing of the second signal may be performed with confidence following the determination that signals from the remote source are being received along the direction of interest (e.g. at least a component of signals transmitted from the remote source are received at the receiver along the direction of interest).

The first and second signals typically have different signal characteristics. In some embodiments, the signal characteristics of the first and second signals may be such that it is advantageous to process the first signal to determine that it has been received along the direction of interest before investing resources in processing the second signal in order to determine the desired metric of interest. Examples of signal characteristics may include sampling rate, bandwidth, signal-to-noise ratio, and encryption properties. The first and second signals typically have substantially the same or similar propagation mechanisms and attributes.

In one embodiment, the second signal has a greater sampling rate than the first signal. Typically, the second signal has a greater bandwidth than the first signal. For example, the second signal may have a greater chipping rate than the first signal. Typically, the first signal has a longer coherence length (1/bandwidth) than the second signal. Embodiments of the present invention are therefore capable of utilizing the reduced processing requirements associated with the first signal in order to determine that a signal has been received along a direction of interest before investing computational resources in processing a second signal received along the direction of interest. In this way, the present invention advantageously minimises power consumption (e.g. extending battery life), whilst simultaneously utilising the enhanced signal characteristics of the second signal (e.g. greater sampling rate and/or bandwidth) in the determination of the metric of interest. In one exemplary embodiment, the first signal may be a GPS L1 C/A signal, and the second signal may be a GPS L5 signal. In general however, embodiments of the present invention may be applied to (e.g. radio) signals other than GNSS positioning signals. For example, embodiments of the present invention may be applied to WiFi, cellular, Bluetooth low energy (BLE) signals, amongst others, which exhibit multiple frequency channels being broadcast by the same remote source (or co-located remote sources). For example the received first signal may be a low bandwidth 3G signal transmitted from a cellular mast. Once it has been determined that the 3G signal is received along the direction of interest, a high bandwidth 4G signal received along the direction of interest may be processed with confidence.

In some embodiments, the first signal may have a greater signal-to-noise (SNR) ratio than the second signal. Thus, it is advantageous to determine that signals from the remote source are received along the direction of interest using the higher SNR first signal, before processing the second signal.

In a further embodiment, at least one of the received signals is encrypted. For example, the first signal may be an encrypted signal, indicating that the remote source may be trusted. In such examples, the second signal is typically unencrypted.

Typically, the first and second signals are transmitted on different frequency channels.

In typical embodiments, the first signal is in a first frequency band, and the second signal is in a second (e.g. different) frequency band. The first and second frequency bands are typically radio frequency bands. In one embodiment, the first and second signals are GNSS positioning signals. Typically, the first frequency band is the GPS L1 band and the second frequency band is the GPS L5 band. In another example, the first signal may be a WiFi signal in the 2.4 GHz frequency band and the second signal may be a WiFi signal in the 5 GHz frequency band.

In embodiments in which the first and second signals are in respective first and second frequency bands, the receiver is typically configured to receive signals in more than one frequency band. Embodiments of the invention may utilise a single receiver (for example the receiver is or comprises a single receiver module) that is configured to receive signals in both the first and second frequency bands. Such a receiver may be referred to as a "dual band" or "multi band" receiver. In alternative embodiments, the receiver may comprise (e.g. separate) first and second receiver modules configured to receive signals within the first and second bands respectively.

As discussed, in some embodiments, the direction of interest is a straight line direction between the receiver and the remote source (e.g. from which the first signal is received). This may be referred to as the "line-of-sight" (LOS) direction between the receiver and the remote source, which may be defined as the shortest distance between the receiver and remote source without any reflections. The approximate LOS direction may be approximately known, for example, by broadcast ephemeris or almanac data in the case where the remote source is a positioning (e.g. GNSS) satellite. This is particularly advantageous when embodiments of the present invention are used to generate a navigation or tracking solution, such that the metric of interest is determined from processing LOS signals using the second signal. However, it is envisaged that in general the direction of interest could be any other direction along which a signal from the remote source is received, for example following a reflection of the signal off a building. This may be useful for example if it is desired to analyse the entire signal environment of the receiver.

In typical embodiments, the second signal will be transmitted from the same remote source as the first signal, for example both signals being transmitted from the same positioning satellite, communications base station, or access point. (It is noted that in practice, the first and second signals may be broadcast from dedicated antennas that are positioned on the same remote source, for example from separate antennas located on the same satellite or base station.) However, it is envisaged that the first and second signals may be transmitted from separate, substantially co-located remote sources, for example from respective positioning satellites in the same area of sky, whereby the second signal is received along the direction of interest and thus has substantially the same angle of arrival at the receiver as the first signal (e.g. the arrival angles of the first and second signals at the receiver differ by less than 2 degrees, and may in some embodiments, by less than 1 degree).

Following determination that the first signal has been received along the direction of interest (e.g. LOS), a second local signal is generated. The second local signal has at least one parameter based on the first signal received along the direction of interest. Thus, the second local signal has at least one parameter that has been determined during the processing of the first signal. In this way, the computational resources required in order to process the second signal are dramatically reduced in comparison to attempting to acquire and track the second signal without the information that has been obtained through processing the first signal within the first frequency band. By generating a second local signal in this way, it is possible to proceed directly to tracking the second local signal. In some embodiments, the system may not perform any processing of received second signals (e.g. no correlations) until it has been determined that the first signal has been received along the direction of interest.

Typically, in embodiments in which the first signal is in a first frequency band and the second signal is in a second frequency band, the first local signal corresponds to the first frequency band and the second local signal corresponds to the second frequency band.

Typically, the at least one parameter of the second local signal is at least one of an expected code phase or (e.g. Doppler) frequency of a second signal being received along the direction of interest. These parameters are determined based on the properties of the received first signal. In some embodiments, the at least one parameter of the second local signal is both of an expected code phase or frequency of a second signal being received along the direction of interest.

In an exemplary embodiment, the method further comprises the step of determining at least one property of the first signal received along the direction of interest, and wherein the at least one parameter of the second local signal is based on the at least one property of the first signal. Typically, the at least one property of the first signal is at least one of (typically both of) a code phase and a frequency of the first signal, wherein the at least one parameter of the second local signal is at least one of (typically both of) an expected code phase or frequency of a second signal being received along the direction of interest (e.g. based on the corresponding properties of the first signal).

These parameters may be used to track the second signal received along the direction of interest at the code phase and frequency predicted by the processing of the first signal. This means that the system does not need to perform a search over the entire code phase and frequency space in order to acquire and subsequently track the second signal, thereby advantageously reducing the processing power required by the system and enhancing battery life. This is particularly beneficial in embodiments where the second signal requires a greater sampling rate than the first signal, as discussed above. Once the second signal is being processed, processing (e.g. tracking) of the first signal may be stopped, further enhancing processing and battery performance. If the second signal is lost, the method may be (e.g. iteratively) re-started based on the processing of the first signal.

In embodiments in which the first and second signals are within respective first and second frequency bands, it will be appreciated that the properties of the first signal will need to be appropriately transformed from the first frequency band to the second frequency band in order to determine the corresponding parameters of the second local signal. However, such a transformation requires considerably reduced processing resources compared to processing a second signal without the information that has been obtained during the processing on the first band. Such transformations may be performed based on the known difference between the nominal (centre) frequencies of the first and second frequency bands.

As discussed, the determination that the first signal has been received along a direction of interest is based on the first motion compensated correlation signal, which is generated by correlating the first local signal with the first received signal to generate a first correlation signal, and providing motion compensation of at least one of the first local signal, the received first signal, and the first correlation signal, based on the determined movement of the receiver along a direction of interest. The motion compensation can be provided using techniques known in the art, some of which will be discussed further herein.

Typically, the determination of a movement of the receiver is performed based on measurements from which position or movement can be determined, obtained from one or more sensors such as inertial sensors. Examples of such inertial sensors include an accelerometer (typically configured to measure linear acceleration) and a gyroscope (typically configured to measure rotational velocity). The inertial sensors may be a part of an inertial measurement unit (IMU). Other examples of sensors that may be used to determine the movement of the receiver include a magnetometer (typically configured to measure a heading reference), a pressure-sensing device such as a barometer (typically configured to measure changes in altitude), LIDARs, RADARs or a camera- or visual odometry-based positioning system. In some embodiments, the determination of the movement of the receiver may be assumed or predicted based on prior motion of the receiver, as will be discussed herein.

By performing motion compensation based on the determined movement of the receiver along a particular direction (e.g. the component of the receiver's motion along a particular direction), the gain for a signal received along that direction (e.g. either a LOS direction or a reflected direction of interest) can be higher than for signals received in other directions. In this way, the motion compensated correlation signal for a particular direction is sensitive to energy arriving from that particular direction. This directionality provided by performing motion compensation can be used to determine if the first signal has been received along the direction of interest.

Therefore, the determination that the first signal has been received along the direction of interest (e.g. at least a component of the first signal is received along the direction of interest) is typically based on a signal quality metric of the first motion compensated correlation signal. The signal quality metric may be a signal-to-noise ratio of the first motion compensated correlation signal. The signal quality metric is typically indicative of the signal power received along the direction in which the motion compensation is applied. The overall signal strength of the received signal may also be taken into account in determining whether the first signal has been received along the direction of interest.

For example, if the SNR of the first motion compensated correlation signal is greater than a predetermined threshold, then this is indicative that the first signal is received along the direction of interest, even if there are components of the same signal arriving at the receiver from other directions (e.g. following one or more reflections). Conversely, if the SNR is below a predetermined threshold (e.g. the SNR is ~1 or less), then this is indicative that the first signal has not been received along the direction of interest, especially if the overall signal strength at the receiver is high. For GNSS signals, an unimpeded LOS signal from the satellite to the ground may be expected to have a particular carrier-to-noise density (C/No) (e.g. 40 dBHz) for a given system, and thus a measurement of the C/No value of the motion compensated correlation signal can be compared to such an expected value (e.g. predetermined threshold) to indicate whether the first signal has been received along the direction of interest (e.g. without reflection).

In some embodiments, the method further comprises generating one or more further first motion compensated correlation signals based on the determined movement of the receiver along a corresponding one or more further directions (e.g. different to the direction of interest), and wherein the determination that the first signal has been received along the direction of interest is based on the plurality of first motion compensated correlation signals. In this way, motion compensation may be used to measure the relative strength of signals arriving from different directions (e.g. based on a signal quality metric of each motion compensated correlation signal).

The plurality of first motion compensated correlation signals may have relatively larger or smaller signal-to-noise or C/No values depending on the direction in which the motion compensation is applied relative to the direction(s) in which the first signal is received. This information may be used to increase the reliability with which the determination that the first signal is received along the direction of interest is made. In embodiments, the plurality of motion compensated correlation signals may be generated substantially simultaneously (e.g. for the same epoch of received signal). This may be achieved by providing a plurality of motion compensation processes for respective different directions substantially simultaneously. In this way, a single epoch of the received signal may be used to generate a plurality of different signal strength values to reveal energy arriving from a respective plurality of different directions.

In embodiments, the method further comprises determining whether the received first signal includes a component received in a direction that is different to the direction of interest. This may be determined based on a plurality of motion compensated correlation signals that are indicative of the relative strength of signals arriving from different directions, as discussed above. In some embodiments, such a determination may be based on a signal quality metric (e.g. signal-to-noise ratio) of the first motion compensated correlation signal(s) and the signal strength of the first signal. For example, if the direction of interest is the LOS direction and the received first signal includes a large reflected component, then the motion compensated correlation signal for the LOS direction may display a small signal-to-noise ratio, even if the overall power of the received signal (e.g. the overall power received at the antenna) is high. This would indicate that a reflected component is present.

In some embodiments the method may comprise determining that the received signal does not include a reflected component (e.g. a determination that the receiver has a "clear sky" line of sight to the remote source). Such a determination step is typically being performed prior to the generation of the second signal. In other words, the second signal may be generated following such a determination that the received signal does not include a reflected component.

Thus, embodiments of the present invention are capable of analysing the signal environment of the receiver through analysis of first signals (e.g. received within the first frequency band) using motion compensation. The use of motion compensation in this way is particularly advantageous as the determination that the first signal has been received along the direction of interest may be made without the use of 3D map aiding to predict the presence of reflected signals. This is advantageous as embodiments of the present invention do not require the creation of or access to topographic (e.g. three dimensional) maps (which may be 3D city maps) or large databases of building data that are required in such 3D map aiding techniques.

Once it has been determined that a first signal from a remote source has been received along a direction of interest—typically a straight line direction between the receiver and the remote source—second signals received along the direction of interest can be processed with confidence. This ensures that the positioning system does not waste processing or battery resources searching for second signals or tracking them when in fact they are not being received along the direction of interest. This enables the performance of the system to be enhanced (e.g. by processing the second signal to determine a metric of interest related to the receiver such as position or speed when it is known that the second signal has been received along the line of sight) whilst maximizing battery performance.

If, on the other hand, it is determined that the first signal has not been received along the direction of interest, the method typically does not perform the steps of generating a second local signal, receiving a second signal, and processing the received second signal.

As discussed previously, in some embodiments, the second signal has a greater sampling rate (e.g. greater chipping rate) than the first received signal. It is further advantageous to use the first signals in order to determine whether a signal has been received along the direction of interest as the reduced sampling rate leads to a wider coverage of search space within a correlation cycle. For example, in the case where the first signal is a GPS L1 C/A signal and the second signal is a GPS L5 signal, the early, prompt and late (separated by half a chip) correlations for the L1 signal can cover approximately 100 m of search space, whereas with the L5 signal the search would cover approximately 10 m of search space. Therefore, the L1 (e.g. reduced bandwidth) signals are advantageous in determining whether a signal from a particular remote source has been received along a direction of interest.

The method comprises processing the received second signal using the second local signal in order to determine a metric of interest related to the receiver, and/or related to a communications link that includes the receiver. For example, the second signal is typically correlated with the second local signal, with the resulting correlation signal used to determine a metric of interest.

The metric of interest related to the receiver may be a position, velocity, time or direction of motion of the receiver (e.g. a "physical" metric related to the receiver). The metric of interest related to the receiver is typically used to determine a tracking or navigation solution for the receiver. In such embodiments the wireless communication system typically is or is part of a positioning system.

Thus, in preferred embodiments, the invention provides a method, performed in a positioning system and comprising the steps of:

generating a first local signal;

receiving, at a receiver, a first signal (e.g. wherein the first signal is a GPS L1 C/A signal) from a remote source;

determining a movement of the receiver;

generating a first correlation signal by correlating the first local signal with the received first signal;

providing motion compensation of at least one of the first local signal, the received first signal, and the first correlation signal based on the determined movement of the receiver along a direction of interest to thereby generate a first motion compensated correlation signal;

determining that the first signal has been received along the direction of interest, based on the first motion compensated correlation signal;

following determining that the first signal has been received along the direction of interest, generating a second local signal, the second local signal having at least one parameter based on the first signal received along the direction of interest;

receiving, at the receiver, a second signal (e.g. wherein the second signal is a GPS L5 signal) along the direction of interest; and processing the received second signal using the second local signal in order to determine a metric of interest related to the receiver (e.g. wherein the metric of interest is at least one of a position, velocity, time, or direction of motion of the receiver).

The second signal may be processed (using the second local signal) in order to determine a metric of interest related to a communications link that includes the receiver. The communications link may be a cellular telecommunications link (e.g. a 3G, 4G or 5G communications link), or a Wi-Fi or a Bluetooth data communications link for example. Examples of metrics of interest related to a communications link and that may be determined by processing the second signal include channel estimation parameters (e.g. channel state information), frequency selection, quality of service, signal availability and the quality of a communications channel between the receiver and remote source.

In some embodiments, the processing of the second signal comprises: generating a second correlation signal by correlating the second local signal with the received second signal; and providing motion compensation of at least one of the second local signal, the received second signal, and the second correlation signal, based on determined movement of the receiver along the direction of interest to thereby generate a second motion-compensated correlation signal (e.g. so as to provide preferential gain for the second signal received along the direction of interest in comparison with a component received in a direction which is not the direction of interest). In such embodiments, the generation of the second motion compensated correlation signal occurs during a second time period that is later than a first time period during which the first motion compensated correlation signal is generated.

By performing motion compensation based on determined movement of the receiver along the direction of interest, the method of various embodiments are capable of advantageously providing preferential gain for the second signal received along the direction of interest. The highest correlation may be achieved for the direction of interest (e.g. LOS) signal, even if the absolute power of this signal is less than that of a signal not received along the direction of interest (e.g. non-LOS signal). The use of motion compensation can also advantageously increase the period of coherent integration of the received signal, thereby enhancing the ability of the system to detect a very weak signal, such as a GNSS signal received indoors or a LOS signal that has passed through a building. An integration time of around 1 second or longer may be required in some arrangements in order to detect a weak signal effectively.

Thus, performing motion compensation for the received second signal can advantageously further improve the accuracy of a metric of interest related to the receiver and/or communications link determined using the second signal, for example by reducing multi-path effects. Such embodiments are particularly advantageous if the processing of the first signal has determined that the received first signal includes a component in a direction that is different from the direction of interest, e.g. reflected signals that are not LOS, and/or if signals received along the direction of interest are weak (e.g. due to attenuation by buildings). On the other hand, if it is determined the first received signal does not include any reflected components (e.g. the receiver is in a "clear sky" environment), then motion compensation for the second frequency band may not be performed, thereby saving battery energy.

As discussed further herein, the provision of motion compensation advantageously compensates for the phase and/or amplitude changes in the received signal as a result of the motion of the receiver. As discussed, motion compensation can be provided to at least one of the local signal, the received signal, and the correlation signal in order to generate a motion-compensated correlation signal. Motion compensation can be provided to the local signal before correlation so that it more closely matches the received signal. In another arrangement, motion compensation may be applied to the received signal to reduce the effect on the received signal of the motion of the receiver. Similar results may be achieved by providing partial motion compensation to both the local signal and the received signal. These techniques allow relative motion compensation to be applied between the local signal and the received signal. In some embodiments motion compensation may be performed in parallel with correlation. Motion compensation can also be applied to the correlation signal directly.

In practice the received signal may be processed as a complex signal, including in-phase and quadrature components. The local signal may be similarly complex. The correlation signal may also be complex and which can be used as a measure of the correlation between these complex signals.

It may be possible to achieve high positioning accuracy by providing motion compensation of at least one of the local signal and the received signal based on the determined movement in the direction of interest. In practice, the local and received signals may be encoded with a code which repeats periodically. In the case of GNSS signals, for the GPS L1 C/A codes for example the local and received signals can include 1023 pseudorandom number code chips. The local and received signals may be analogue waveforms which may be digitised to provide values at the radio sampling rate, which means there may be millions of values over a 1 ms time period. The correlation between the local signal digital values and the received signal digital values may be calculated, having first corrected either set of values using a motion compensation phasor (described herein) for the relevant time period. These data points may then be summed over the time period. In practice this can produce an accurate result because it works at the radio sampling frequency, although it may be computationally intensive.

The motion-compensated correlation signal may be generated by providing motion compensation to the correlation signal. In such cases, a correlation result is typically obtained using one or more codewords (which are 1 ms long in the case of GPS L1 C/A codes and contain 1023 chips), and motion compensation is provided to the obtained correlation result.

In a further example, the correlation may be performed independently on each of the ~1000 pseudorandom number code chips to produce ~1000 complex correlator signal outputs. Motion compensation can then be applied to these ~1000 correlation signal components. Finally, these signal outputs can be summed to produce a measure of the correlation. This approach may provide an approximation of the result that can be achieved by motion compensation of the local signal and the received signal. However, for some applications the loss in accuracy may be negligible, and may be accepted because it enables a reduction in computational load.

As has been discussed above, in embodiments of the present invention, motion compensation is performed to obtain motion compensated correlation signals for received first signals (e.g. to determine LOS and non-LOS directions) and received second signals (e.g. to generate an enhanced tracking or navigation solution based on the received second signal). In some embodiments, the motion compensation provided during the generation of the second motion compensated correlation signal is based on the motion compensation provided during the generation of the first motion compensated correlation signal corresponding to the direction of interest. Typically, one or more parameters for providing the motion compensation during the generation of the second motion compensated correlation signal are based on corresponding one or more parameters for providing the motion compensation during the generation of the first motion compensated correlation signal corresponding to the direction of interest.

In other words, the motion compensation parameter(s) based on the determined movement of the receiver used to generate the first motion compensated correlation signal corresponding to the direction of interest may be re-used or form the basis for the motion compensation parameters used to generate the second motion compensated correlation signal. This advantageously reduces the computational load when performing motion compensation to generate the second motion-compensated correlation signal. Such parameters may include motion compensation phasor sequences as discussed below. The motion compensation parameter(s) may be re-used if the motion of the receiver is determined to be substantially the same (e.g. within a predetermined threshold) during the first and second time periods within which the respective motion-compensated correlation signals are generated. Otherwise, the motion-compensation parameters are re-calculated during the second time period in order to generate the second motion-compensated correlation signal.

Typically, the providing motion compensation (e.g. when generating either the first or second motion compensated correlation signals) comprises: generating a phasor sequence comprising a plurality of phasors indicative of the phase and/or amplitude changes introduced into the received signal (e.g. over time) as a result of the determined motion of the receiver (e.g. in the respective direction), each phasor including a phase angle and an amplitude, and combining (e.g. mixing) the phasor sequence with said at least one of the local signal, the received signal, and the correlation signal. In this way, the phasors may be described as being indicative of the determined movement of the receiver (e.g. in the respective direction).

Typically, the phasor sequence is derived from the determined movement of the receiver as a function of time. For example, each phasor within a phasor sequence may be indicative of the determined movement of the receiver during a particular time interval. Thus, the resulting phasor sequence is indicative of (e.g. corresponds to) the determined movement of the receiver during a time period made up of the individual time intervals. The motion of the receiver may be determined through measurement of the receiver motion (e.g., using one or more measurements of gyroscope, magnetometer, accelerometer, velocity, step counting, etc,) or through assuming the receiver motion based upon past motion (e.g., constant motion in a particular direction due to travel in a vehicle or repetitive motion due to pedestrian travel). In addition, motion may be extrapolated or computed from prior motion in specific environments. Machine learning techniques may be used in such situations to predict receiver motion. The phasor sequence may reflect a detailed movement of the receiver in time. For example, the plurality of phasors within a phasor sequence may reflect the motion of the receiver while it rests in a user's pocket while jogging, walking, running or undergoing some other repetitive motion. In this example, the receiver may execute cyclical motion with peaks in acceleration corresponding to each heel strike. If motion measurements are not available or are inaccurate, the motion may be assumed (e.g. "predicted") from this repetitive motion.

Typically, the first and second local signals are each based on a local frequency or phase reference provided by a local oscillator, such as a quartz crystal. In some embodiments, the motion compensation (e.g. when generating either the first or second motion compensated correlation signals) may comprise correcting for an error in the frequency or phase reference.

In some embodiments, the first and second local signals are each based on a local frequency or phase reference provided by a local oscillator, and wherein the phasor sequence is further indicative of an error in the frequency or phase reference provided by the local oscillator. The error in the local oscillator may be determined by an offset between the local frequency or phase reference and a received frequency or received phase of a reference signal received from an oscillator reference source, said reference signal having a known or predictable frequency or phase; and wherein said phasor sequence is indicative of the determined offset (e.g. as a function of time). The phase angles and/or amplitudes of the phasor sequence may be adjusted based on the determined offset (or time series of offsets). Such embodiments advantageously facilitate the removal of errors introduced to the correlation signal by instabilities in the local oscillator of the positioning system. This is particularly advantageous in implementations where the local oscillator is simple and low cost such as a quartz crystal (e.g. used in consumer devices such as smart phones).

In another example, an error in the frequency or phase reference provided by the local oscillator may be determined by using a plurality of phasor sequences (e.g. for each particular direction of interest) that are indicative of a respective plurality of different predictions—or "hypotheses"—of the local oscillator error. The plurality of phasor sequences may be indicative of respective predictions of frequency and/or rate of change of frequency offsets of the local oscillator. In this way, a plurality of motion compensated correlation signals may be generated, with the motion compensated correlation signal exhibiting the highest power corresponding to the error of the local oscillator.

In embodiments, the error in the frequency or phase reference provided by the local oscillator is determined by the processing of the received first signal. For example, different hypotheses of the local oscillator error may be used when generating the first motion compensated correlation signal, or an offset determined to a reference signal having a known or predictable frequency or phase. The determined local oscillator error based on the first signal may advantageously then be used during the processing of the second signal. This advantageously reduces the computational resources required when processing the second signal.

In various embodiments, the phasor sequence used to generate the second motion compensated correlation signal is based on the phasor sequence used to provide the first motion compensated correlation signal corresponding to the direction of interest. For example, the phasor sequence(s) used to generate the first motion compensated correlation signal along the direction of interest (e.g. LOS) may be stored in addressable memory and accessed when generating the second motion compensated correlation signal. This "re-use" of the phasor sequences advantageously reduces the processing resources required to generate the second motion compensated correlation signal. The motion compensation phasor sequences may be re-used in the event that the motion of the receiver is substantially the same during the processing of the first and second signals. In embodiments in which the first and second signals are in different frequency bands, it will be appreciated that, because of the difference in frequency bands of the first and second signals, the phasor sequence(s) will need to have an transformation (e.g. offset) applied when used in relation to the second motion compensated correlation signal. However, the processing power required to apply such an transformation is negligible in comparison to re-generating the entire phasor sequence(s).

In this way, by basing the phasor sequence used to generate the second motion compensated correlation signal on the phasor sequence used to provide the first motion compensated correlation signal, information determined during processing of the first signal (for example an error in the frequency or phase reference provided by the local oscillator) may advantageously be used in the processing of the received second signal, thereby reducing computational load.

As a further advantage provided by embodiments of the present invention, generating the second local signal having at least one parameter based on the first signal received along the direction of interest has the advantage that it is possible to track second signals (e.g. within the second frequency band) that may be too weak to acquire directly, either due to the environment (e.g. the LOS second signal may pass through a building between the remote source and the receiver), or due to an antenna of the receiver (e.g. the antenna not having enough gain). In other words, directional information about where to track the second signal, obtained from the analysis of the first signal, means that it may be possible to track second signals that would otherwise not have been able to be acquired. The use of motion compensation (both in the analysis of the first signal and optionally also in the subsequent processing of the second signal) to enhance the gain of the received second signal along the direction of interest advantageously means that it may be possible to detect and track the second signal using an antenna that was not specifically designed for such signals. This advantageously means that a lower quality or cheaper antenna may be used, or an existing antenna (e.g. a cellular antenna) within the system may be "re-used". Thus, the number of antennas in the system may be reduced. This may be particularly advantageous when the system is implemented on a consumer electronic device such as a modern smartphone.

For example, in the case where the first signal is a GPS L1 C/A signal and the second signal is a GPS L5 signal and the (e.g. positioning system) is implemented in a smartphone, it may be possible to "re-use" a cellular antenna for tracking of the L5 signal due to the enhanced gain and sensitivity provided by the present invention, rather than requiring a separate L5 antenna.

In accordance with a second aspect of the invention, there is provided a non-transitory computer readable medium comprising executable instructions which, when executed by a processor in a wireless communication system, cause the processor to perform the steps of any of the embodiments of the first aspect described above.

Further disclosed herein is a wireless communication system, comprising: a receiver (e.g. configured to receive signals from a remote source); and one or more processors configured to perform the method as set out in any of the examples discussed above.

In accordance with a third aspect of the invention there is provided a wireless communication system, comprising: a receiver (e.g. configured to receive signals from a remote source); a motion unit configured to determine a movement of the receiver; and one or more processors configured to perform the steps of: generating a first local signal; receiving, at the receiver, a first signal from a remote source; determining a movement of the receiver; generating a first correlation signal by correlating the first local signal with the received first signal; providing motion compensation of at least one of the first local signal, the received first signal, and the first correlation signal based on the determined movement of the receiver along a direction of interest to thereby generate a first motion compensated correlation signal; determining that the first signal has been received along the direction of interest, based on the first motion compensated correlation signal; following determining that the first signal has been received along the direction of interest, generating a second local signal, the second local signal having at least one parameter based on the first signal received along the direction of interest; receiving, at the receiver, a second signal along the direction of interest; and processing the received second signal using the second local signal in order to determine a metric of interest related to the receiver, and/or related to a communications link that includes the receiver.

The system of the third aspect therefore provides all of the advantages discussed above. In general, the one or more processors may be configured to perform any of the method steps outlined above.

The one or more processors are typically further configured to perform the step of determining at least one property of the first signal received along the direction of interest, and wherein the at least one parameter of the second local signal is based on the at least one property of the first signal. Typically, as discussed above, the at least one property of the first signal is at least one of a code phase and a frequency of the first signal, wherein the at least one parameter of the second local signal is at least one of an expected code phase or frequency of a second signal (e.g. within a second frequency band) being received along the direction of interest.

In various embodiments, the one or more processors are configured to determine whether the received first signal includes a component received in a direction that is different to the direction of interest.

In various embodiments, the one or more processors are further configured to perform the steps of: generating a second correlation signal by correlating the second local signal with the received second signal; and providing motion compensation of at least one of the second local signal, the received second signal, and the second correlation signal, based on determined movement of the receiver along the direction of interest to thereby generate a second motion-compensated correlation signal (e.g. so as to provide preferential gain for the second signal received along the direction of interest in comparison with a component received in a direction which is not the direction of interest).

In various embodiments, the system further comprises addressable storage configured to store one or more parameters for providing motion compensation during the generation of the first motion compensated correlation signal corresponding to the direction of interest. Such parameter(s) may be re-used (e.g. with appropriate transformations) when generating a second motion compensated correlation signal using the received second signal, advantageously reducing battery resources.

Typically, the one or more processors are configured to generate a phasor sequence comprising a plurality of phasors indicative of the phase and/or amplitude changes introduced into the received signal as a result of the determined motion of the receiver, each phasor including a phase angle and an amplitude, wherein the phasor sequence is combined with at least one of the local signal, the received signal, and the correlation signal.

Typically, the system further comprises a local oscillator configured to provide a local frequency or phase reference (e.g. for the generation of the first and second local signals). In embodiments, the phasor sequence is further indicative of an error in the frequency or phase reference provided by the local oscillator. In this way, a moving receiver can provide longer coherent integration of signals than would otherwise be possible, as described above.

Typically, the receiver is configured to receive signals in more than one frequency band.

The wireless communications system as described herein is typically a positioning system, and may, in some embodiments, be a GNSS positioning system. In embodiments, the system may be a communications system such as a cellular communications system, or a Wi-Fi or Bluetooth communications system.

The system is typically provided on a single user device, such as a positioning device or electronic user device such as a smartphone. Alternatively, various units in the system could be provided separately so that the system is distributed (i.e. configured as a distributed system). For example, certain calculations may be undertaken by processors in a network. Thus, an electronic user device may offload calculations to other processors in a network where appropriate in the interests of efficiency.

The remote source(s) from which signals are received is typically a trusted remote source (such as a GNSS positioning satellite), from which received data may be trusted, i.e. assumed to be correct. A received signal may include any known or unknown pattern of transmitted information, either digital or analogue, that can be found within a broadcast signal by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions. In a further example, the received signals may include pilot symbol sequences that may be used for correlation, such as those used in orthogonal frequency division multiplexing (OFDM), long term evolution (LTE) and digital video broadcasting (DVB) standards.

In various embodiments of the invention in which the first and second signals are in different frequency bands, the second frequency band is typically the L5 GNSS frequency band. In some embodiments, the first frequency band is the GNSS L1 frequency band.

In any of the aspects of the present invention, the receiver may be a GNSS receiver. The receiver may be implemented on an electronic user device such as a smartphone. The remote source is typically a GNSS satellite. However, as discussed the present invention may also be applied to other (e.g. radio) signals such as cellular, DAB or DVB, Wi-Fi or Bluetooth signals received from respective remote sources.

In embodiments, the determined metric of interest related to the receiver and/or related to a communications link that includes the receiver may comprise one or more of: a position of the receiver, a velocity of the receiver, a direction of motion of the receiver, a time at the receiver, a tracking or navigation solution for the receiver, one or more channel estimation parameters, a channel frequency selection parameter, a quality of service metric, a signal availability metric, a quality metric of a communication channel between the receiver and remote source. Embodiments of the invention may also be used to enhance reception of signals, as has been discussed.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follows.

The invention claimed is:

1. A method, performed in a wireless communication system and comprising the steps of:
   generating a first local signal;
   receiving, at a receiver, a first signal from a remote source;
   determining a movement of the receiver;
   generating a first correlation signal by correlating the first local signal with the received first signal;
   providing motion compensation of at least one of the first local signal, the received first signal, and the first correlation signal based on the determined movement of the receiver along a direction of interest to thereby generate a first motion compensated correlation signal;
   determining that the first signal has been received along the direction of interest, based on the first motion compensated correlation signal;
   following determining that the first signal has been received along the direction of interest, generating a second local signal, the second local signal having at least one parameter based on the first signal received along the direction of interest;
   receiving, at the receiver, a second signal along the direction of interest; and
   processing the received second signal using the second local signal in order to determine a metric of interest related to the receiver, and/or related to a communications link that includes the receiver.

2. The method of claim 1, wherein at least one of:
   the second signal has a greater sampling rate than the first signal,
   the first and second signals have different signal characteristics,
   the second signal is received from the remote source, or from a second remote source co-located with the remote source,
   the second signal has a greater bandwidth than the first signal,
   the first signal has a greater signal-to-noise ratio than the second signal,
   at least one of the first and second signals is encrypted, or
   the direction of interest is a straight line direction between the receiver and the remote source, or
   the determination that the first signal has been received along the direction of interest is based on a signal quality metric of the first motion compensated correlation signal.

3. The method of claim 1, wherein the first signal is in a first frequency band, and the second signal is in a second frequency band, and the first local signal corresponds to the first frequency band, and the second local signal corresponds to the second frequency band.

4. The method of claim 1, further comprising the step of determining at least one property of the first signal received along the direction of interest, and wherein the at least one parameter of the second local signal is based on the at least one property of the first signal.

5. The method of claim 4, wherein the at least one property of the first signal is at least one of a code phase and a frequency of the first signal, wherein the at least one parameter of the second local signal is at least one of an expected code phase or frequency of a second signal being received along the direction of interest.

6. The method of claim 1, further comprising generating one or more further first motion compensated correlation signals based on the determined movement of the receiver along a corresponding one or more further directions, and wherein the determination that the first signal has been received along the direction of interest is based on the plurality of first motion compensated correlation signals.

7. The method of claim 1, further comprising determining whether the received first signal includes a component received in a direction that is different to the direction of interest.

8. The method of claim 1, wherein the processing the second signal comprises:
    generating a second correlation signal by correlating the second local signal with the received second signal; and
    providing motion compensation of at least one of the second local signal, the received second signal, and the second correlation signal, based on determined movement of the receiver along the direction of interest to thereby generate a second motion-compensated correlation signal so as to provide preferential gain for the second signal received along the direction of interest in comparison with a component received in a direction which is not the direction of interest.

9. The method of claim 8, wherein one or more parameters for providing the motion compensation during the generation of the second motion compensated correlation signal are based on corresponding one or more parameters for providing the motion compensation during the generation of the first motion compensated correlation signal corresponding to the direction of interest.

10. The method of claim 1, wherein the providing motion compensation comprises:
    generating a phasor sequence comprising a plurality of phasors indicative of the phase and/or amplitude changes introduced into the received signal as a result of the determined motion of the receiver, each phasor including a phase angle and an amplitude; and
    combining the phasor sequence with at least one of the local signal, the received signal, and the correlation signal.

11. The method of claim 10, wherein the first and second local signals are each based on a local frequency or phase reference provided by a local oscillator, and wherein the phasor sequence is further indicative of an error in the frequency or phase reference provided by the local oscillator.

12. The method of claim 10, wherein the phasor sequence used to generate the second motion compensated correlation signal is based on the phasor sequence used to provide the first motion compensated correlation signal corresponding to the direction of interest.

13. A non-transitory computer readable medium comprising executable instructions which, when executed by a processor in a wireless communication system, cause the processor to perform
    a method comprising the steps of:
    generating a first local signal;
    receiving, at a receiver, a first signal from a remote source;
    determining a movement of the receiver;
    generating a first correlation signal by correlating the first local signal with the received first signal;
    providing motion compensation of at least one of the first local signal, the received first signal, and the first correlation signal based on the determined movement of the receiver along a direction of interest to thereby generate a first motion compensated correlation signal;
    determining that the first signal has been received along the direction of interest, based on the first motion compensated correlation signal;
    following determining that the first signal has been received along the direction of interest, generating a second local signal, the second local signal having at least one parameter based on the first signal received along the direction of interest;
    receiving, at the receiver, a second signal along the direction of interest; and processing the received second signal using the second local signal in order to determine a metric of interest related to the receiver, and/or related to a communications link that includes the receiver.

14. A wireless communication system, comprising:
    a receiver;
    a motion unit configured to determine a movement of the receiver; and
    one or more processors configured to perform the steps of:
    generating a first local signal;
    receiving, at the receiver, a first signal from a remote source;
    determining a movement of the receiver;
    generating a first correlation signal by correlating the first local signal with the received first signal;
    providing motion compensation of at least one of the first local signal, the received first signal, and the first correlation signal based on the determined movement of the receiver along a direction of interest to thereby generate a first motion compensated correlation signal;
    determining that the first signal has been received along the direction of interest, based on the first motion compensated correlation signal;
    following determining that the first signal has been received along the direction of interest, generating a second local signal, the second local signal having at least one parameter based on the first signal received along the direction of interest;
    receiving, at the receiver, a second signal along the direction of interest; and
    processing the received second signal using the second local signal in order to determine a metric of interest related to the receiver, and/or related to a communications link that includes the receiver.

15. The system of claim 14, wherein the one or more processors are further configured to perform the step of determining at least one property of the first signal received along the direction of interest, and wherein the at least one parameter of the second local signal is based on the at least one property of the first signal.

16. The system of claim 15, wherein the at least one property of the first signal is at least one of a code phase and a frequency of the first signal, wherein the at least one parameter of the second local signal is at least one of an expected code phase or frequency of a second signal being received along the direction of interest.

17. The system of claim 14, wherein the one or more processors are configured to determine whether the received first signal includes a component received in a direction that is different to the direction of interest.

18. The system of claim 14, wherein the one or more processors are further configured to perform the steps of: generating a second correlation signal by correlating the second local signal with the received second signal; and providing motion compensation of at least one of the second local signal, the received second signal, and the second correlation signal, based on determined movement of the receiver along the direction of interest to thereby generate a second motion-compensated correlation signal so as to provide preferential gain for the second signal received along the direction of interest in comparison with a component received in a direction which is not the direction of interest.

19. The system of claim 14, wherein the one or more processors are configured to generate a phasor sequence comprising a plurality of phasors indicative of the phase and/or amplitude changes introduced into the received signal as a result of the determined motion of the receiver, each phasor including a phase angle and an amplitude, wherein the phasor sequence is combined with at least one of the local signal, the received signal, and the correlation signal, and wherein the system further comprises a local oscillator configured to provide a local frequency or phase reference, and wherein the phasor sequence is further indicative of an error in the frequency or phase reference provided by the local oscillator.

20. The system of claim 14, wherein at least one of:

the receiver is configured to receive signals in more than one frequency band, the system is provided on a single user device, the first signal is in the L1 GNSS frequency band and the second signal is in the L5 GNSS frequency band, the receiver is a GNSS receiver, the receiver is implemented on an electronic user device including a smartphone, or the wireless communications system is a positioning system, including a GNSS positioning system.

\* \* \* \* \*